No. 651,787. Patented June 12, 1900.
A. B. WAGGONER.
SPRING WHEEL FOR BICYCLES.
(Application filed Sept. 15, 1899.)
(No Model.)
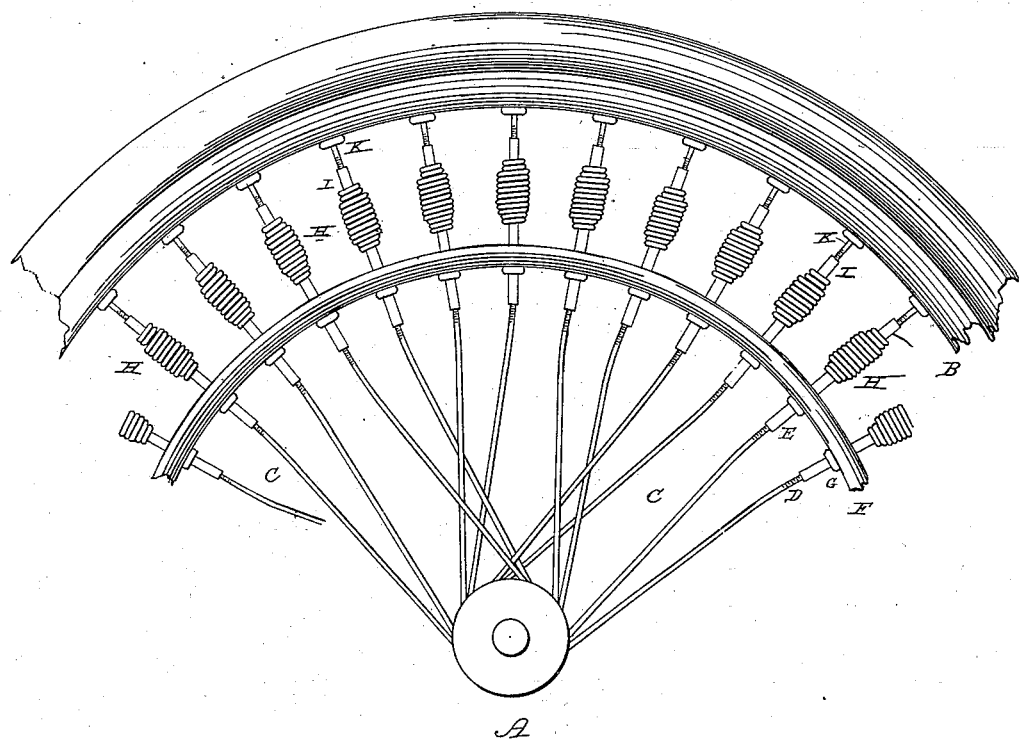
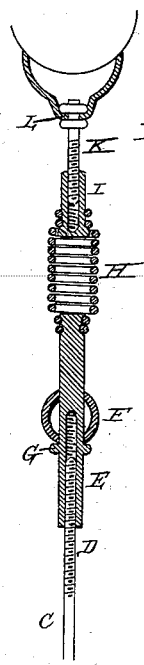
Witnesses
J. L. Bullock
R. F. Lacey
Inventor
Albert B. Waggoner
by Fred Beall and
J. W. Garner, Attorneys.
THE NORRIS PETERS CO., PHOTO-LITHO., WASHINGTON, D. C.

UNITED STATES PATENT OFFICE.

ALBERT B. WAGGONER, OF ARKANSAS CITY, KANSAS.

SPRING-WHEEL FOR BICYCLES.

SPECIFICATION forming part of Letters Patent No. 651,787, dated June 12, 1900.

Application filed September 15, 1899. Serial No. 730,570. (No model.)

*To all whom it may concern:*

Be it known that I, ALBERT B. WAGGONER, a citizen of the United States, and a resident of Arkansas City, in the county of Cowley and State of Kansas, have invented certain new and useful Improvements in Spring-Wheels for Bicycles and other Vehicles, of which the following is a specification.

This invention is an improvement on the spring-wheel for which Letters Patent of the United States No. 607,201, dated July 12, 1898, were granted to me and William Waggoner; and the objects of my present improvements are, first, to provide means for stiffening the spoke-rods, and thereby add to the strength and rigidity of the wheel and more effectually adapt it to resist lateral stress, and, secondly, to provide means for tightening the spoke-rods and for adjusting them as may be required and also to provide means for regulating the tension of the springs.

A further object of my invention is to so construct the parts of the wheel as to facilitate the assembling and disassembling thereof and enable any part thereof which may become injured or disabled to be removed and replaced.

My invention consists in the peculiar construction and combination of devices, that will be more fully set forth hereinafter and particularly pointed out in the claims.

In the accompanying drawings, Figure 1 is an elevation of a portion of a bicycle-wheel embodying my improvements. Fig. 2 is a detail sectional view.

A represents the hub of the wheel, and B the tire and rim thereof, the said tire and rim being constructed of sheet-steel in the manner described in the Letters Patent hereinbefore mentioned. The spoke-rods C have their inner ends secured to the hub and are provided at their outer extremities with the screw-threads D, the said threaded portions of the spoke-rods being received in sleeve-nuts E, which are swiveled in a stiffening-ring F. The said stiffening-ring is tubular in form, made, preferably, of sheet steel or iron, and is of less diameter than the rim of the wheel and is arranged within the wheel and concentrically with relation to the hub and rim, and the said sleeve-nuts are inserted in openings in the stiffening-ring, are adapted to move radially inward therein, and are provided with annular bosses G, which bear against the inner side of the stiffening-ring and limit the outer movements of the said sleeve-nuts.

H represents coiled retractile springs which are somewhat tightly coiled and are of suitable size and strength and are attached to the outer ends of the sleeve-nuts. In the outer end of each of the said springs is a sleeve-nut I, which said sleeve-nuts I are engaged by screw-rods K, the outer ends of which are swiveled in the inner side of the rim of the wheel, as at L, and thereby adapted to be turned so as to set the springs at any desired tension. By turning the sleeve-nuts E the stiffening-ring may be adjusted to a concentric position and the stress evenly distributed to all of the spoke-rods, as will be readily understood.

Having thus described my invention, I claim—

1. In a wheel, the combination with the spoke-rods, the rim, and the stiffening-ring, of the springs connected to the rim and spoke-rods, and means for adjusting the said spoke-rods, substantially as described.

2. In a wheel, the combination with the spoke-rods, the rim, and the stiffening-ring, of the springs connected to the rim and spoke-rods, and means to regulate the tension of said springs, substantially as described.

3. In a wheel, the combination of the rim, the springs H, attached thereto, the stiffening-ring, the spoke-rods, and the sleeve-nuts E, swiveled in the stiffening-ring, connected at their outer ends to the springs, and having their ends connected to the spoke-rods by screw connections, substantially as described.

4. In a wheel, the combination of the rim, the springs H, the screw-rods, swiveled to the rim, and engaging sleeve-nuts in the outer ends of the springs, the stiffening-ring, the sleeve-nuts E, swiveled therein, and having their outer ends connected to the springs, and the spoke-rods C, having their outer ends screwed to the said sleeve-nuts, E, substantially as described.

5. In a wheel, the combination with the hub, the stiffening-ring F, and the rim, of the screw-rods K swiveled to the rim, the sleeve-nuts E swiveled in the stiffening-ring, the sleeve-nuts I engaged by the said screw-rods K, the springs H, connecting the proximate ends of the said sleeve-nuts E and I, and the spoke-rods C connecting the hub with the inner ends of the said sleeve-nuts E, substantially as described.

Signed by me at Arkansas City, Kansas, this 10th day of March, 1899.

ALBERT B. WAGGONER.

Witnesses:
HATTIE FRAREY,
MORRISON BOWER.